(12) United States Patent
Chang et al.

(10) Patent No.: US 8,568,154 B2
(45) Date of Patent: Oct. 29, 2013

(54) STRUCTURE FOR ELECTRONICALLY CONNECTING BETWEEN TWO DEVICES

(75) Inventors: Ju-Hee Chang, Seongnam-si (KR); Jung-Eun Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 12/876,491

(22) Filed: Sep. 7, 2010

(65) Prior Publication Data
US 2011/0104941 A1 May 5, 2011

(30) Foreign Application Priority Data
Nov. 3, 2009 (KR) .................... 10-2009-0105311

(51) Int. Cl.
*H01R 29/00* (2006.01)
(52) U.S. Cl.
USPC ........................................... 439/173
(58) Field of Classification Search
USPC ......... 439/244, 157, 172, 173, 155, 929, 164; 361/679.44, 683; 248/176.1
See application file for complete search history.

(56) References Cited

U.S. PATENT DOCUMENTS

| | | | |
|---|---|---|---|
| 6,193,546 B1 * | 2/2001 | Sadler | 439/534 |
| 6,576,840 B1 * | 6/2003 | Huang et al. | 174/69 |
| 6,981,887 B1 * | 1/2006 | Mese et al. | 439/244 |
| 6,994,575 B1 * | 2/2006 | Clark et al. | 439/173 |
| 7,175,450 B1 * | 2/2007 | Lung | 439/155 |
| 7,719,830 B2 * | 5/2010 | Howarth et al. | 361/679.41 |
| 7,733,643 B1 * | 6/2010 | Rumpf | 361/679.43 |
| 8,083,195 B2 * | 12/2011 | Osada | 248/274.1 |
| 2006/0013411 A1 * | 1/2006 | Lin | 381/87 |
| 2006/0250764 A1 * | 11/2006 | Howarth et al. | 361/683 |
| 2008/0280461 A1 * | 11/2008 | DiFonzo et al. | 439/39 |

* cited by examiner

*Primary Examiner* — Alexander Gilman
(74) *Attorney, Agent, or Firm* — Jefferson IP Law, LLP

(57) ABSTRACT

A structure for electronically connecting between two devices is provided. The structure includes a mount structure capable of mounting a first device, and a connector maintaining electronic connection with a second device and being movable on the mount structure depending on a connection position with the mounted first device.

29 Claims, 10 Drawing Sheets

STRUCTURE FOR ELECTRONICALLY CONNECTING BETWEEN TWO DEVICES

PRIORITY

This application claims the benefit under 35 U.S.C. §119(a) of a Korean patent application filed in the Korean Intellectual Property Office on Nov. 3, 2009 and assigned Serial No. 10-2009-0105311, the entire disclosure of which is hereby incorporated by reference.

BACKGROUND OF THE INVENTION

1. Field of the Invention

The present invention relates to a structure for electronically connecting between two devices. More particularly, the present invention relates to a structure for electronically connecting between two devices by mounting one of the devices on the other device.

2. Description of the Related Art

Recently, owing to technical developments in the electronic industry, portable terminals such as cellular phones, electronic organizers, Personal Digital Assistants (PDAs), etc. are providing a variety of advanced multimedia functions to address user demands. For example, a speaker unit capable of realizing melodies of various harmonies is installed, and a color display device with millions of pixels is realized. Furthermore, the portable terminals are being made smaller in size, lighter in weight, and slimmer in thickness. Furthermore, portable terminals are seeking alternatives for overcoming limitations regarding the strength of their various functions.

Generally, a portable terminal may selectively connect with a peripheral device to perform an additional function or improve a previous function. For example, the peripheral device may be an input device such as a microphone capable of inputting a signal to the portable terminal or may be an output device such as a speaker capable of receiving a signal from the portable terminal for output.

FIG. 1 is a schematic diagram illustrating a method for electronically connecting a portable terminal with a peripheral device according to the conventional art.

Referring to FIG. 1, the portable terminal and the peripheral device are electronically connected with each other through the medium of a cable. However, in the absence of the cable, the portable terminal and the peripheral device cannot be electronically connected with each other. Furthermore, use of the cable is cumbersome in that it takes up additional space between the portable terminal and the peripheral device and must be stored when not in use. This causes an inconvenience to a user. Accordingly, there is a need for an improved apparatus and method for electronically connecting two devices.

SUMMARY OF THE INVENTION

An aspect of the present invention is to address at least the above-mentioned problems and/or disadvantages and to provide at least the advantages described below. Accordingly, an aspect of the present invention is to provide a structure for electronically connecting between two devices.

Another aspect of the present invention is to provide a structure for electronically connecting between two devices without using a cable.

Yet another aspect of the present invention is to provide a structure for electronically connecting between two devices by mounting one device on another device.

A further aspect of the present invention is to provide a structure for electronically connecting one device to any of a plurality of devices.

The above aspects are achieved by providing a structure for electronically connecting between two devices.

In accordance with an aspect of the present invention, a structure for electronically connecting between two devices is provided. The structure includes a mount structure for mounting a first device, and a connector, movable on the mount structure depending on a connection position of the mounted first device, for maintaining electronic connection with a second device and being movable on the mount structure depending on a connection position with the mounted first device.

In accordance with another aspect of the present invention, an external connector structure of a device is provided. The structure includes a mount structure, forming an outward appearance, for mounting another device, a connector movable on the mount structure depending on a connection position with the mounted other device, and a press means for pressing and holding the mounted other device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to a structure that provides an electronic connection between two devices. In an exemplary implementation, the invention includes electronically connecting between two devices wherein the first device is one of several devices that can be mounted, without the medium of a cable, on the second device.

Figure 1:
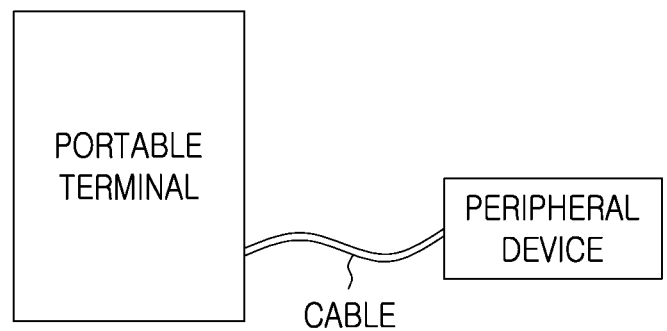
FIG. 1 is a schematic diagram illustrating a method for electronically connecting a portable terminal with a peripheral device according to the conventional art.
Figure 2:
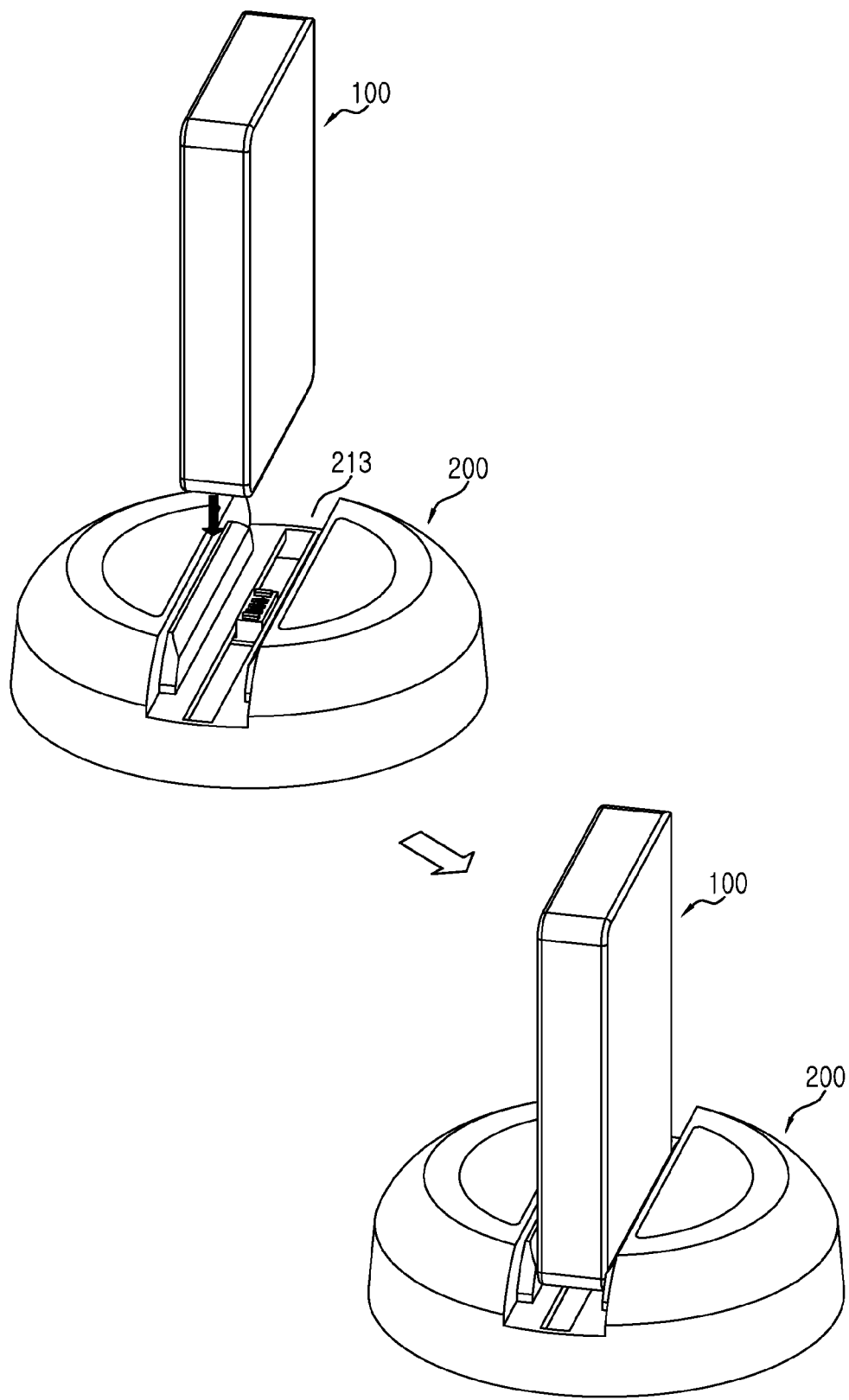
FIG. 2 is a diagram illustrating an electronic connection operation according to an exemplary embodiment of the present invention.

FIG. 2 is a diagram illustrating an electronic connection operation according to an exemplary embodiment of the present invention.

Referring to FIG. 2, a peripheral device 200 and a portable terminal 100 are illustrated as examples of a first device and a second device, respectively. The peripheral device 200 includes a slot 213 formed in its frame for fitting the portable terminal 100 therein. Furthermore, the peripheral device 200 includes one or more electrical connectors within slot 213 for electronically connecting to a second device placed into the slot 213. For example, the portable terminal 100 may be fitted into the slot 213 of the peripheral device 200 by a downward motion as illustrated in FIG. 2 such that an electrical connector of portable terminal 100 makes an electrical connection to the one or more electrical connectors of the peripheral device 200. That is, the portable terminal 100 may be mounted on the peripheral device 200 and thus, electronically connected with the peripheral device 200.

Figure 3:
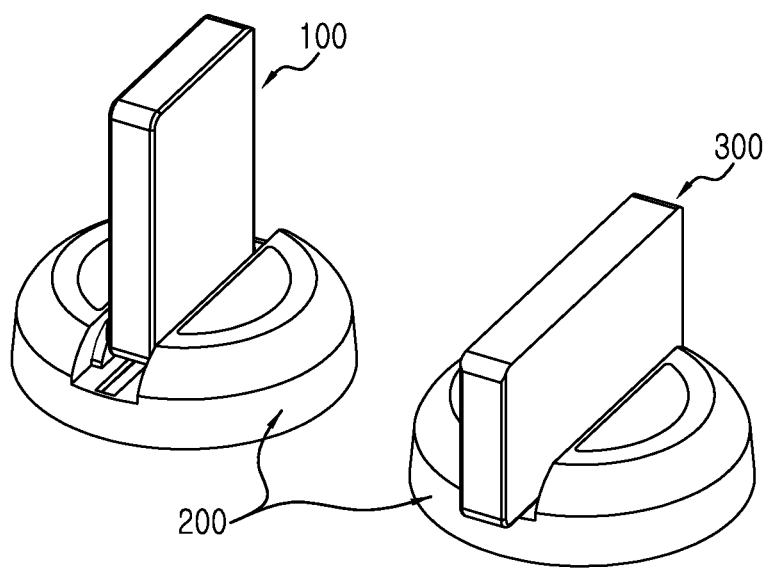
FIG. 3 is a diagram illustrating selectively mounting several devices on a peripheral device according to an exemplary embodiment of the present invention.

FIG. 3 is a diagram illustrating selectively mounting several devices on a peripheral device according to an exemplary embodiment of the present invention.

Referring to FIG. 3, the peripheral device 200 may mount either of a first portable terminal 100 and a second portable terminal 300 thereon.

As illustrated in FIGS. 2 and 3, a structure for electronically connecting between two devices according to an exemplary embodiment of the present invention may electronically connect the first portable terminal 100 or the second portable terminal 300 with the peripheral device 200 without the medium of a cable. Also, the structure for electronically connecting between two devices according to an exemplary embodiment of the present invention makes it possible to commonly mount a plurality of terminals on the peripheral device 200. That is, although FIG. 3 only illustrates the first portable terminal 100 and the second portable terminal 300 as capable of mounting on the peripheral device 200, it is to be understood that this is merely for brevity and conciseness of description but is not intended to be limiting.

The first portable terminal 100 or the second portable terminal 300 may include a speaker for outputting a voice signal or a display for outputting a video signal. Furthermore, the first portable terminal 100 or the second portable terminal 1300 may include a keypad assembly that is a data input means or a microphone for inputting a voice signal. If either of the first portable terminal 100 or the second portable terminal 300 includes a display, the display may be a Liquid Crystal Display (LCD) having millions of pixels. Also, if a touch screen is provided in the LCD, the display may be able to perform a function of a data input unit, in addition to or in place of the keypad assembly. Furthermore, the first portable terminal 100 or the second portable terminal 300 may include a communication module, thus being capable of performing mobile communication.

The peripheral device 200 may be any one of a speaker, a microphone, a battery charger, a portable printer, a handsfree unit, and the like. The peripheral device 200 may input a signal to the first portable terminal 100 or the second portable terminal 300. For example, the peripheral device 200 may be a microphone capable of inputting a voice signal to the first portable terminal 100 or the second portable terminal 300. Also, the peripheral device 200 may receive a signal from the first portable terminal 100 or the second portable terminal 300 for output. For instance, the peripheral device 200 may be a speaker for outputting a sound. Also, the peripheral device 200 may input and output data.

Figure 4:
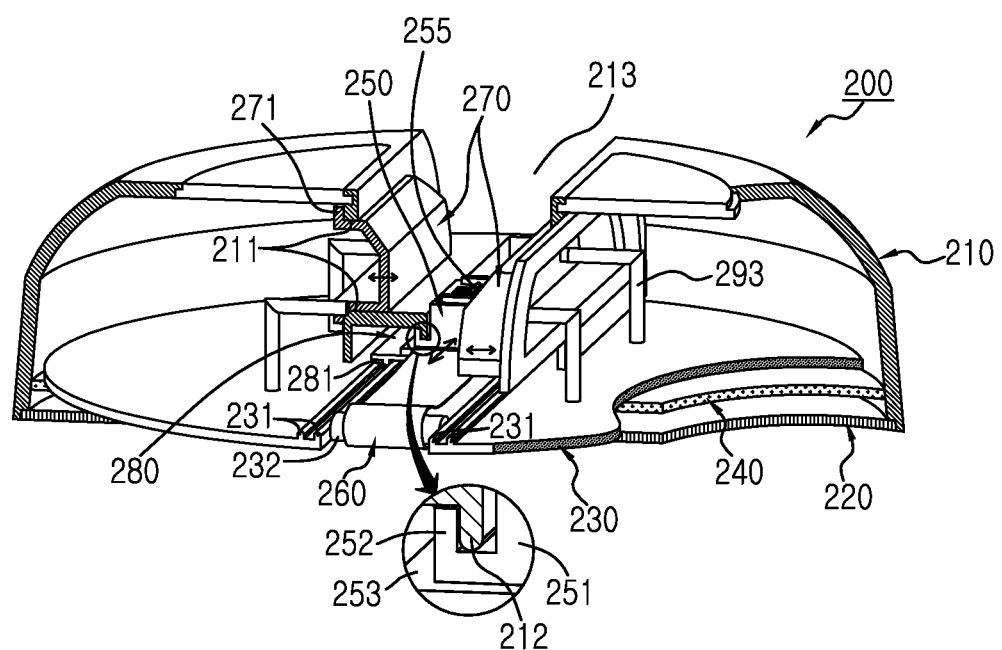
FIG. 4 is a diagram illustrating a peripheral device according to an exemplary embodiment of the present invention.

FIG. 4 is a diagram illustrating a peripheral device including a structure for electronically connecting two devices according to an exemplary embodiment of the present invention.

Referring to FIG. 4, the peripheral device 200 includes a case frame that houses an electronic unit 240 for performing a corresponding function and defines an outer surface. The case frame may include an upper case frame 210 and a lower case frame 220 coupled to the upper case frame 210. The electronic unit 240 may include a main board or a Printed Circuit Board (PCB) assembly. The electronic unit 240 may electronically connect with a portable terminal using the connection structure according to an exemplary embodiment of the present invention. For example, the electronic unit 240 may be any one of a microphone unit, a speaker unit, a battery charger unit, a portable printer unit, a handsfree unit, and the like.

As illustrated in FIG. 4, an exemplary structure for electronic connection between two devices includes a connector 250 for electronically connecting with another device, a movement means for guiding a movement of the connector 250, and a connection means 260 for connecting the connector 250 with the electronic unit 240. In addition, the structure for electronic connection between two devices further includes means for elastically pressing and holding a device connecting to the connector 250.

The connector 250 includes a body 251 for exposing a connect pin 255 and a medium plate 253 for connecting the connect pin 255 to the connection means 260.

The movement means includes a bracket or plate 230 that has a first guide rail 231 for guiding a movement of the connector 250, an elbow-shaped slide shaft 252 whose movement is guided on the first guide rail 231 at its bottom, and a carrier 280 for safely mounting the connector 250 at its top. More specifically, the carrier 280 includes a detent 281 for interfacing with the first guide rail 231 and guiding the movement of the elbow-shaped slide shaft 252. That is, the movement of the connector 250 fixed to the carrier 280 is guided by the first guide rail 231 in conjunction with detent 281.

Furthermore, the movement means includes the elbow-shaped slide shaft 252 formed in the body 251, and a second guide rail 212 for interfacing with the slide shaft 252 to guide the movement of the slide shaft 252. In an exemplary implementation, the second guide rail 212 is coupled with the upper case frame 210 and interfaces with the slide shaft 252 by exerting a downward force. Because the second guide rail 212 exerts the downward force on the slide shaft 252, the upward movement of connector 250 is limited. The first guide rail 231 and the second guide rail 212 provide substantially the same movement path.

In other words, the movement means includes the case frame having at least one or more guide rails for guiding and moving the connector 250 without release and/or the bracket or plate 230 additionally fixed to the case frame.

The connection means 260 may include a Flexible Printed Circuit Board (FPCB) or a flexible cable such that the connection means 260 is not destroyed even when the connector 250 moves. The connection means 260 is electronically connected to the unit 240, which is provided below the bracket 230, through a through-hole part 232 formed in the bracket 230. Furthermore, the connection means 260 may be formed such that the connector 250 moves independently of the connection means 260 (e.g., slides above the connection means 260 while maintaining an electrical connection with the connection means 260) or formed so as to terminate at the connector 250 such that the connection means 260 moves in conjunction with movement of the connector 250. In the latter case, the connection means 260 has a length taking into consideration the maximum movement distance of the connector 250.

The means for elastically pressing and holding the device includes through-holes or openings 211 formed in upper case frame 210 and provided to face each other at both sides of the slot 213, holders 270 that may retractably protrude through the through-holes 211, and an elastic means for applying an elastic force capable of causing the holders 270 to protrude through the through-holes 211.

The holder 270 has an end 271 for preventing the holder 270 from being released from the through-hole 211. The second guide rail 212 may extend from a wall in which the through-hole 211 is formed. Also, the wall including the second guide rail 212 may be formed in the bracket 230.

The elastic means may be a cantilever spring 293 fixed to the bracket 230 and supporting an inner wall of the holder 270.

The two holders 270 applying the elastic force may move independently of each other.

Figure 5:
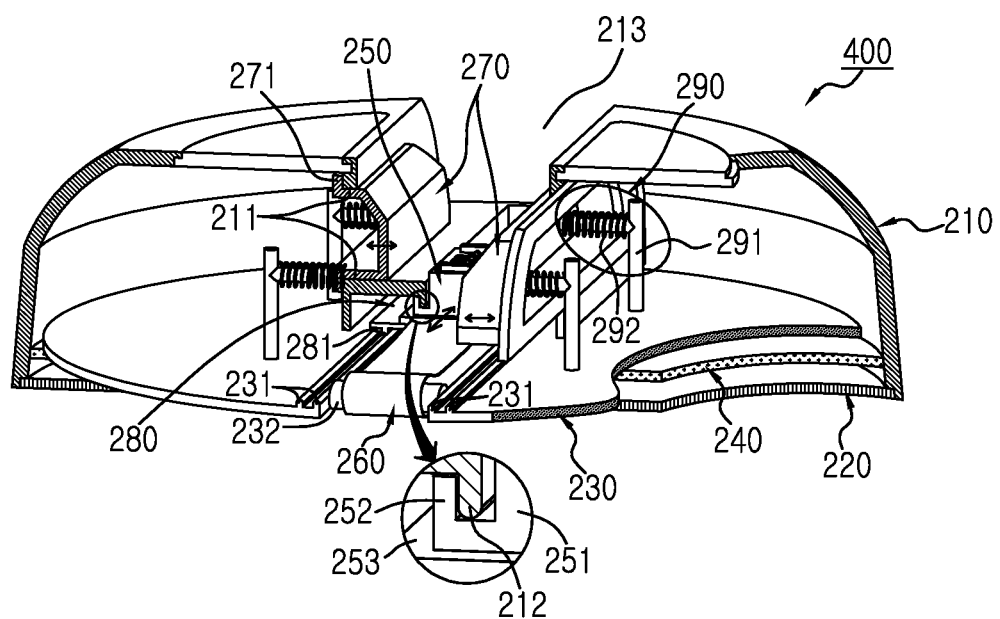
FIG. 5 is a diagram illustrating a peripheral device according to an exemplary embodiment of the present invention.

FIG. 5 is a diagram illustrating a peripheral device according to an exemplary embodiment of the present invention. In the description of FIG. 5, constituent elements described earlier in FIG. 4 are not described again for conciseness.

Referring to FIG. 5, it is shown that peripheral device 400 includes an elastic means for applying elastic force to holders 270 that is different from that of the peripheral device 200 of FIG. 4.

The elastic means 290 of FIG. 5 includes a cantilever 291 fixed to a bracket 230, and a coil spring 292 supporting the cantilever 291 and pressing the holder 270.

Figure 6:
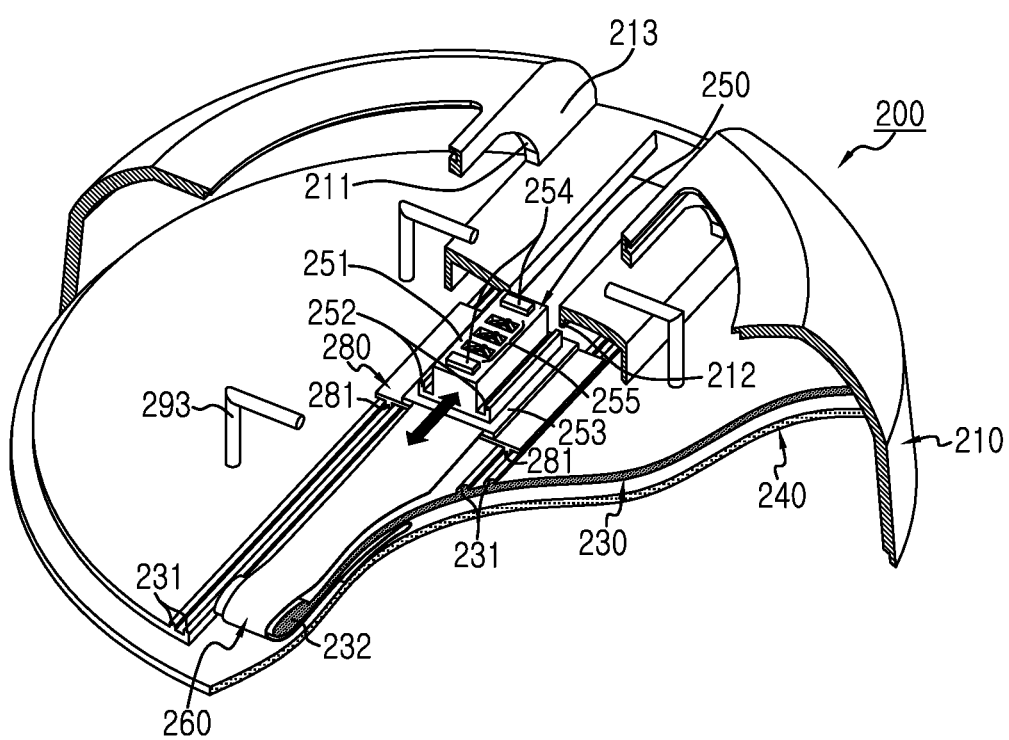
FIG. 6 is a diagram illustrating a connector of a peripheral device according to an exemplary embodiment of the present invention.

FIG. 6 is a diagram illustrating a connector of a peripheral device according to an exemplary embodiment of the present invention. In the description of FIG. 6, constituent elements described in the previous drawings are not described again for conciseness.

Referring to FIG. 6, the connector 250 includes at least one connect pin 255 protruding upward from the body 251, and magnetic plates 254 provided near the at least one connect pin 255.

The at least one connect pin 255 is constructed corresponding to a signal pad of a corresponding terminal. For instance, the at least one connect pin 255 may include a pin for grounding. Also, in an exemplary implementation, polarities of a pair of the magnetic plates 254 illustrated in FIG. 6 are different from each other.

As mentioned above, the connector 250 is able to move. Thus, the connector 230 is movable to positions corresponding to connectors of various other devices that may be connected to the connector 250.

Figure 7:
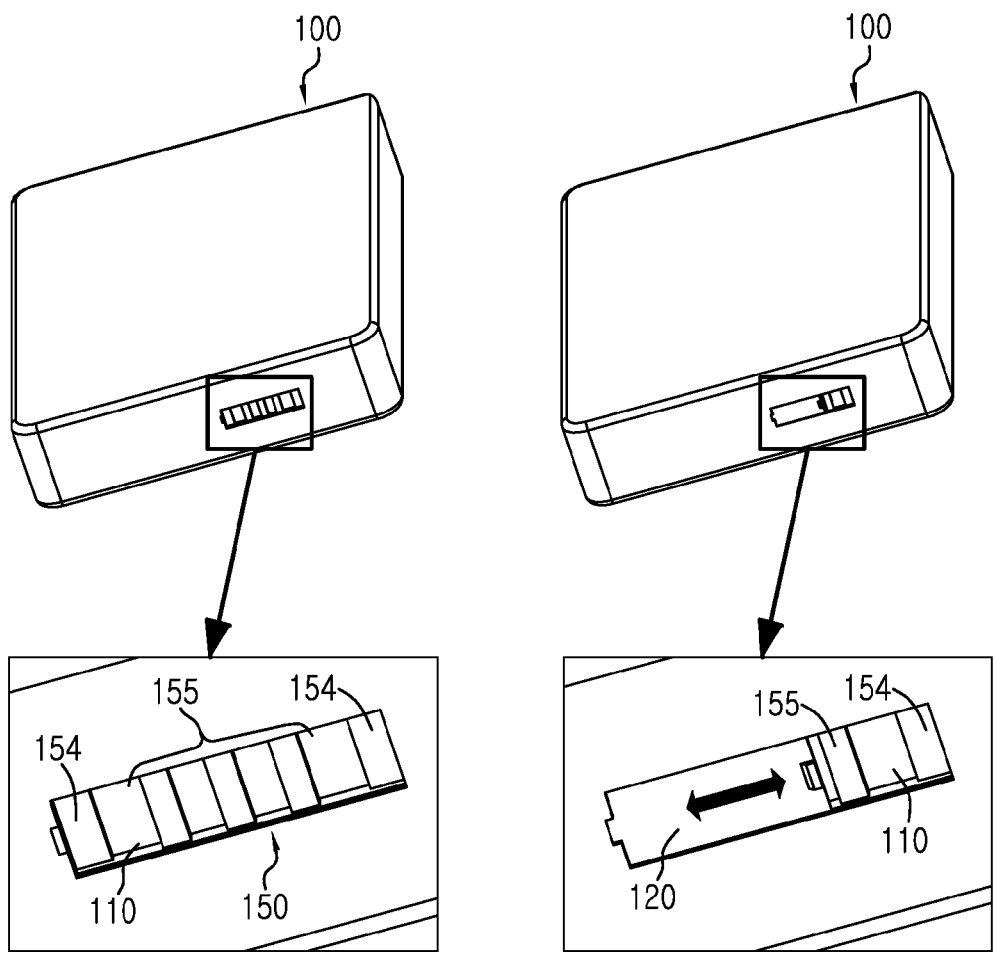
FIG. 7 is a diagram illustrating a connector according to an exemplary embodiment of the present invention.

FIG. 7 is a diagram illustrating a connector according to an exemplary embodiment of the present invention.

Referring to FIG. 7, the connector 150 of a second device 100 includes signal pads 155 corresponding to the at least one connect pin 255 of the peripheral device 200. Furthermore, the connector 150 includes magnetic plates 154 to provide an attractive force with the magnetic plates 254 of the peripheral device 200. In case that the second device 100 including connector 150 is mounted on the peripheral device 200, because of the attraction between the magnetic plates 154 and 254 provided in the two devices 100 and 200, the two connectors 150 and 250 easily connect with each other. That is, the magnetic plates 154 and 254 provide an attractive force to determine a contact position between the second device 100 and the connector 250.

The signal pad 155 and the magnetic plates 154 are provided in a groove 110 located in the case frame defining an outer surface of the second device 100. Also, the connector 150 of the second device 100 further includes a cover 120 capable of opening/closing the groove 110.

Figure 8:
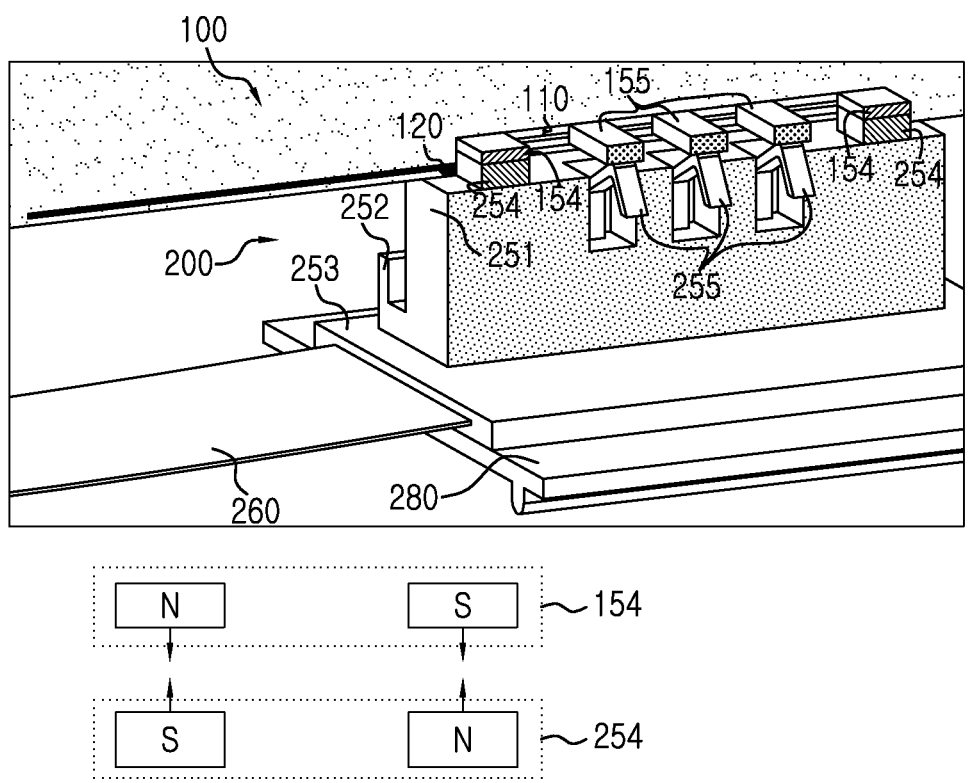
FIG. 8 is a diagram illustrating a state of connection between two connectors of a second device and a peripheral device according to an exemplary embodiment of the present invention.

FIG. 8 is a diagram illustrating a state of connection between two connectors of a second device and a peripheral device according to an exemplary embodiment of the present invention. In the description of FIG. 8, constituent elements described in previous drawings are not described again for conciseness.

Referring to FIG. 8, the at least one connect pin 255 presses against the signal pad 155 by elastic force and thus can avoid non-contact. Also, the two connectors 150 and 250 can be bound in a defined position by arranging magnetic plates 154 and 254 so as to provide an attractive force between the two devices 100 and 200. Although it is illustrated in FIG. 8 that two magnetic plates 154 have opposite polarity to each other, wherein each magnetic plate 154 also has a polarity opposite that of opposing magnetic plate 254, this is merely an example. That is, each of the magnetic plates 154 may have the same polarity as the other, as can each of the magnetic plates 254, provided that the polarity of magnetic plates 154 is opposite that of magnetic plates 254. Furthermore, while two magnetic plates are illustrated for each of magnetic plates 154 and 254, this is merely for example and each of the connectors may have any number of magnetic plates. As mentioned above, the at least one connect pin 255 is connected to the connection means 260 through the medium plate 253.

Figure 9:
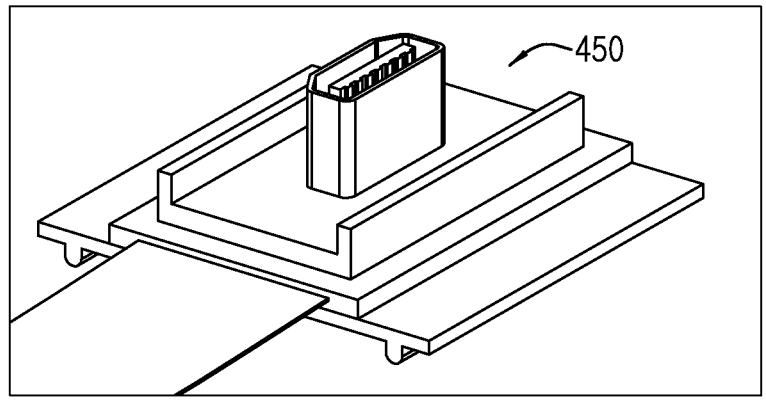
FIG. 9 is a diagram illustrating connectors of a peripheral device and a second device according to an exemplary embodiment of the present invention.
Figure 9:
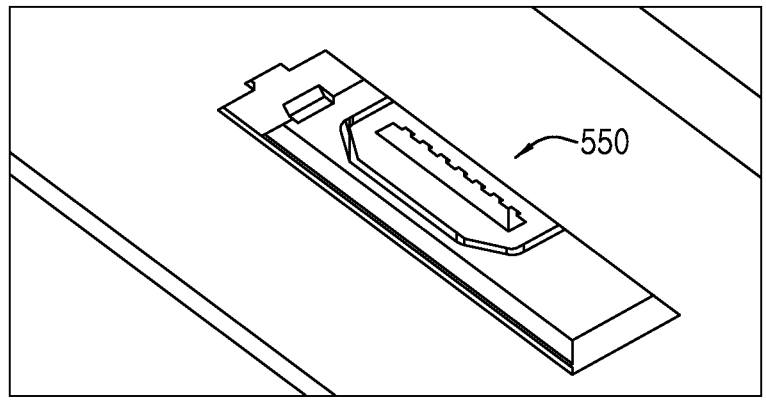

FIG. 9 is a diagram illustrating connectors of a peripheral device and a second device according to an exemplary embodiment of the present invention.

Referring to FIG. 9, the connector 450 of the peripheral device includes respective pins for respective signals. The connector 550 of the second device has a socket structure capable of matching with the connector 450 of the peripheral device. For instance, the connectors 450 and 550 may have a structure of a Universal Serial Bus (USB) scheme. Accordingly, the connection illustrated in FIG. 9 does not use magnetic plates illustrated in the previous drawings. Furthermore, the connector 550 of the second device may be constructed to have a taper in its insertion port such that the connector 450 of the peripheral device can be easily inserted into the connector 550 of the second device. Also, as illustrated, the connector 550 of the second device may be opened/closed with a cover.

Figure 10:
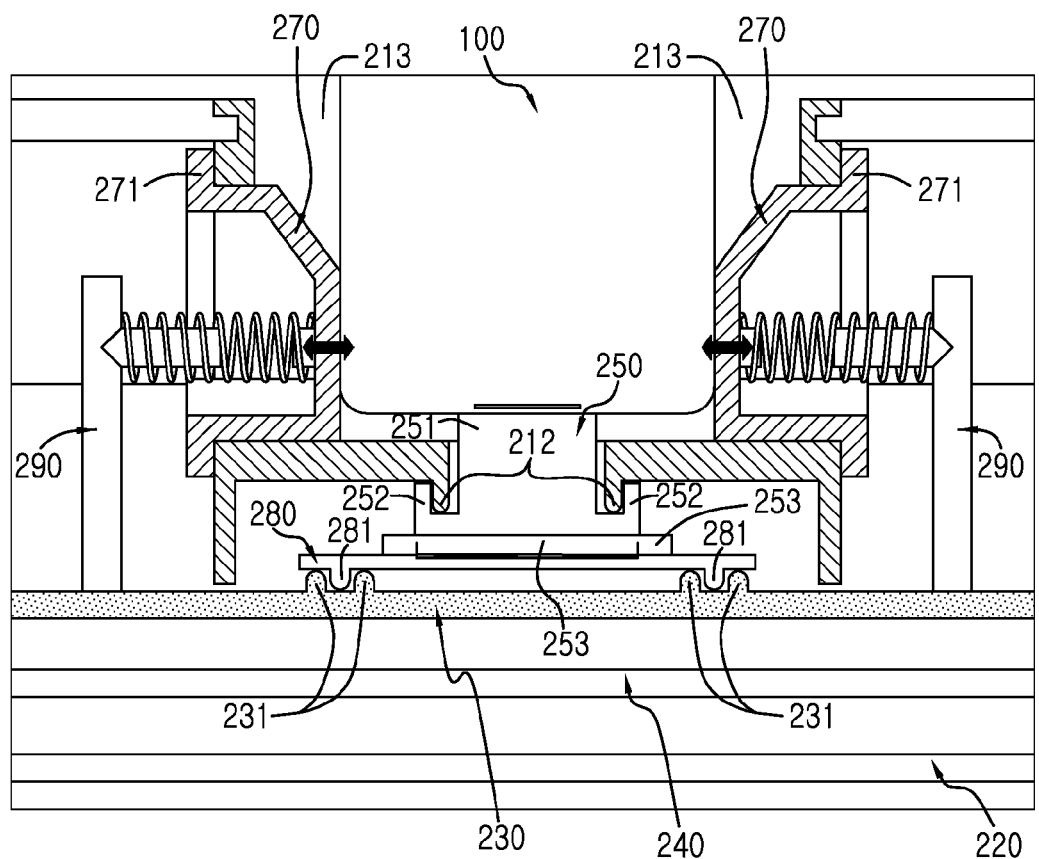
FIG. 10 is a cross section illustrating a state in which a second device is mounted on a peripheral device according to an exemplary embodiment of the present invention.

FIG. 10 is a cross section illustrating a state in which a second device is mounted on a peripheral device according to an exemplary embodiment of the present invention. In the description of FIG. 10, constituent elements described in previous drawings are not described again for conciseness.

Referring to FIG. 10, the second device 100 is fitted into the slot 213 of the upper case frame 210 of the peripheral device 200. Here, the holders 270 may move left/right (relative to the drawing sheet) based on application of the elastic force. The holders 270 press and fit the second device 100 into the slot 213 and face each other to hold the second device 100. That is, a second device having a connector corresponding to the connector 250 of the peripheral device 200 can electronically connect with the peripheral device 200 regardless of its outward appearance.

A structure for electronically connecting between two devices according to an exemplary embodiment of the present invention can electronically connect a plurality of specified devices to the other device, without the use of a cable, thus enhancing cost reduction and compatibility.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A speaker apparatus for mounting a portable device and for electronically connecting with the portable device, the apparatus comprising:
   a mount structure for mounting the portable device;
   a connector, movable on the mount structure with respect to a location of a connecting port of the portable device;
   a speaker unit for outputting sound; and
   a charger for charging the portable device,
   wherein the portable device is mountable on the mount structure by connecting the connector with the connecting port of the portable device,
   wherein electronic connection is maintainable with the portable device upon connecting the connector to the connecting port of the portable device,
   wherein the mount structure includes at least one guide for guiding the connector to be movable without release in a direction perpendicular to a direction of insertion of the portable device, and
   wherein the charger charges the portable terminal via the connector.

2. The apparatus of claim 1, further comprising a press means for pressing and holding the portable device.

3. The apparatus of claim 2, wherein the press means comprises:
   through-holes provided in the mount structure;
   holders for retractably protruding through the through-holes; and
   an elastic means for pressing the holders in a protrusion direction through the through-holes.

4. The apparatus of claim 3, wherein the elastic means comprises at least one of a cantilever spring and a coil spring.

5. The apparatus of claim 1, further comprising a carrier for mounting the connector,
   wherein the mount structure comprises at least one of a guide rail for guiding a movement of the carrier and a bracket additionally fixed to the mount structure.

6. The apparatus of claim 1, further comprising a slide shaft constructed in the connector,
   wherein the mount structure comprises at least one of a guide rail for guiding a movement of the slide shaft and a bracket additionally fixed to the mount structure.

7. The apparatus of claim 1, wherein the guide comprises at least one of one or more guide rails.

8. The apparatus of claim 1, wherein the apparatus at least one of inputs a signal to the portable device mountable on the mount structure and receives and outputs a signal from the portable device.

9. The apparatus of claim 1, wherein the apparatus comprises at least one of a microphone unit, a battery charger unit, a portable printer unit, and a handsfree unit.

10. The apparatus of claim 1, wherein the portable device comprises at least one of a speaker unit, a display for outputting a video signal, a keypad assembly including a data input means, a microphone for inputting a voice signal, and a communication module for performing mobile communication.

11. The apparatus of claim 1, further comprising an element for determining a contact position between the connector and the connecting port of the portable device.

12. The apparatus of claim 11, wherein the connector of the apparatus and the connecting port of the portable device each have a pair of magnetic plates having different polarities, and are arranged such that attraction acts in the contact position.

13. The apparatus of claim 1, wherein the connecting port of the portable device is arranged so as to be opened/closed with a cover.

14. The apparatus of claim 1, wherein the connector of the apparatus is connected with the connecting port of the portable device through at least one of a Flexible Printed Circuit Board (FPCB) and a flexible cable.

15. The apparatus of claim 14, wherein the connector comprises:
   at least one connect pin; and
   a medium plate for connecting the at least one connect pin to the at least one of the FPCB and the flexible cable.

16. The apparatus of claim 1, wherein the connector of the apparatus and the connecting port of the portable device forward a signal using a Universal Serial Bus (USB) scheme.

17. A speaker apparatus for mounting a portable device and for electronically connecting with the portable device, the apparatus comprising:
   a mount structure, forming an outward appearance, for mounting the portable device;
   a connector, movable on the mount structure to correspond to a location of a connecting port of the portable device;
   a press means for pressing and holding the portable device;
   a speaker unit for outputting sound; and
   a charger for charging the portable device,
   wherein the portable device is mountable on the mount structure by connecting the connector with the connecting port of the portable device,
   wherein electronic connection is maintainable with the portable device upon connecting the connector to the connecting port of the device,
   wherein the mount structure includes at least one guide rail for guiding the connector to be movable without release in a direction perpendicular to a direction of insertion of the portable device and a bracket additionally fixed to the mount structure, and wherein the charger charges the portable terminal via the connector.

18. The apparatus of claim 17, wherein the press means comprises:

through-holes provided in the mount structure;

holders for retractably protruding through the through-holes; and an elastic means for pressing the holders through the through-holes.

19. The apparatus of claim 18, wherein the elastic means comprises at least one of a cantilever spring and a coil spring.

20. The apparatus of claim 17, further comprising:

a carrier for mounting the connector; and at least one or more slide shafts constructed in at least one of the connector and the carrier, wherein the mount structure comprises at least one of one or more guide rails for guiding the slide shaft to move without release.

21. The apparatus of claim 17, wherein the apparatus at least one of inputs a signal to the portable device and receives and outputs a signal from the portable device.

22. The apparatus of claim 17, wherein the apparatus comprises at least one of a microphone unit, a battery charger unit, a portable printer unit, and a handsfree unit.

23. The apparatus of claim 17, wherein the connector of the apparatus and the connecting port of the portable device each have a pair of magnetic plates having different polarities, and are arranged such that attraction acts in a contact position.

24. A speaker apparatus for mounting a portable device and for electronically connecting with the portable device, the apparatus comprising:

a mount structure including:

a connector for connecting and mounting the portable device;

a carrier for mounting the connector, the carrier being movable in at least one direction perpendicular to a direction of insertion of the portable device;

at least one guide for guiding the motion of the carrier; and at least one supporting unit for supporting the portable device while the portable device is connected to the apparatus;

a speaker unit for outputting sound; and a charger for charging the portable device.

25. The apparatus of claim 24, wherein the carrier includes a detent.

26. The apparatus of claim 25, wherein one of the at least one guide interacts with the detent.

27. The apparatus of claim 24, wherein one of the at least one guide is a guide rail.

28. The apparatus of claim 24, wherein one of the at least one supporting element is a magnetic plate.

29. The apparatus of claim 24, wherein the at least one guide comprises at least one sliding shaft.

\* \* \* \* \*